(12) United States Patent
Kesse et al.

(10) Patent No.: US 7,832,200 B2
(45) Date of Patent: Nov. 16, 2010

(54) EXHAUST SYSTEM IMPLEMENTING FEEDFORWARD AND FEEDBACK CONTROL

(75) Inventors: Mary Lou Kesse, Hanna City, IL (US); Chris L. Wynkoop, Eureka, IL (US); Zhiyong Wei, Chicago, IL (US); Michael S. Lukich, Chillicothe, IL (US); Wade D. Scrivner, Washington, IL (US); Amit Jayachandran, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 115 days.

(21) Appl. No.: 12/081,893

(22) Filed: Apr. 23, 2008

(65) Prior Publication Data

US 2009/0266058 A1 Oct. 29, 2009

(51) Int. Cl.
*F01N 3/00* (2006.01)
(52) U.S. Cl. .............................. 60/286; 60/274; 60/295; 60/297; 60/301; 60/311
(58) Field of Classification Search .................. 60/295, 60/297, 301, 274, 286, 311, 303
See application file for complete search history.

(56) References Cited

U.S. PATENT DOCUMENTS

| | | | |
|---|---|---|---|
| 5,047,220 A | 9/1991 | Polcer | |
| 5,085,049 A | 2/1992 | Rim et al. | |
| 5,924,280 A * | 7/1999 | Tarabulski | 60/274 |
| 6,125,629 A | 10/2000 | Patchett | |
| 6,361,754 B1 | 3/2002 | Peter-Hoblyn et al. | |
| 6,455,009 B1 | 9/2002 | Kato et al. | |
| 6,823,663 B2 * | 11/2004 | Hammerle et al. | 60/286 |
| 6,877,312 B2 | 4/2005 | Nakatani et al. | |
| 6,928,361 B2 | 8/2005 | Nakayama et al. | |
| 6,993,900 B2 | 2/2006 | Upadhyay et al. | |
| 7,047,729 B2 | 5/2006 | van Nieuwstadt et al. | |
| 7,055,311 B2 | 6/2006 | Beutel et al. | |
| 7,055,313 B2 * | 6/2006 | Russell | 60/295 |
| 7,065,959 B2 * | 6/2006 | Ueno et al. | 60/295 |
| 7,168,411 B2 | 1/2007 | Bourn et al. | |
| 7,231,290 B2 | 6/2007 | Steichen et al. | |
| 7,316,107 B2 | 1/2008 | Aratsuka et al. | |
| 7,534,738 B2 * | 5/2009 | Fujdala et al. | 502/74 |
| 7,624,570 B2 * | 12/2009 | Reuter et al. | 60/286 |
| 7,650,746 B2 * | 1/2010 | Hu et al. | 60/286 |
| 2006/0086080 A1 * | 4/2006 | Katogi et al. | 60/278 |
| 2007/0079601 A1 * | 4/2007 | Hirata et al. | 60/286 |
| 2008/0022659 A1 * | 1/2008 | Viola et al. | 60/286 |
| 2008/0306631 A1 * | 12/2008 | Huang | 700/271 |

* cited by examiner

*Primary Examiner*—Thomas E Denion
*Assistant Examiner*—Diem Tran
(74) *Attorney, Agent, or Firm*—Finnegan, Henderson, Farabow, Garrett & Dunbar LLC

(57) ABSTRACT

An exhaust system for use with a combustion engine is disclosed. The exhaust system may have an exhaust passageway, and a reduction catalyst disposed within the exhaust passageway. The exhaust system may also have a first sensor located to generate a first signal indicative of an operational parameter of the reduction catalyst, and a second sensor located to generate a second signal indicative of a performance parameter of the reduction catalyst. The exhaust system may further have an injection device located to inject reductant upstream of the reduction catalyst, and a controller in communication with the combustion engine, the first sensor, the second sensor, and the injection device. The controller may be configured to determine a $NO_X$ production of the combustion engine, determine an amount of reductant that should be injected based on the $NO_X$ production and the first signal, and adjust the amount based on the second signal.

20 Claims, 2 Drawing Sheets

EXHAUST SYSTEM IMPLEMENTING FEEDFORWARD AND FEEDBACK CONTROL

TECHNICAL FIELD

The present disclosure is directed to an exhaust system and, more particularly, to an exhaust aftertreatment system that implements feedforward and feedback control.

BACKGROUND

Internal combustion engines, including diesel engines, gasoline engines, gaseous fuel-powered engines, and other engines known in the art exhaust a complex mixture of air pollutants. These air pollutants are composed of gaseous compounds such as, for example, the oxides of nitrogen ($NO_X$). Due to increased awareness of the environment, exhaust emission standards have become more stringent, and the amount of $NO_X$ emitted from an engine may be regulated depending on the type of engine, size of engine, and/or class of engine. In order to ensure compliance with the regulation of these compounds, some engine manufacturers have implemented a strategy called Selective Catalytic Reduction (SCR).

SCR is a process where gaseous or liquid reductant (most commonly a solution of urea solid and water) is added to the exhaust gas stream of an engine and is adsorbed onto a catalyst. The reductant reacts with $NO_X$ in the exhaust gas to form $H_2O$ and $N_2$, which can be safely released to the atmosphere. Although SCR can be an effective method for reducing $NO_X$, it can be difficult to ensure that enough reductant has been injected to adequately reduce the amount of $NO_X$ present within the exhaust gas stream, without unnecessarily wasting reductant and releasing unused reductant or byproducts thereof to the atmosphere.

One attempt to regulate the injection of reductant is described in U.S. Pat. No. 6,361,754 (the '754 patent) issued to Peter-Hoblyn et al. on Mar. 26, 2002. The '754 patent discloses an exhaust system for reducing $NO_X$ emissions from an internal combustion engine. The exhaust system includes an exhaust pipe of an engine, and an SCR catalyst located within the exhaust pipe. The exhaust system also includes a tank of urea, a pump that pressurizes the urea, a valve that meters the pressurized urea, and a nozzle that injects the metered and pressurized urea into the exhaust pipe upstream of the SCR catalyst.

The injection of urea into the exhaust by the system of the '754 patent is regulated by a feedforward controller in response to a number of measured parameters, including: fuel flow, throttle setting, engine speed, rack setting, intake air temperature, barometric pressure, intake air humidity, and exhaust gas temperature. In addition, to the extent the sensors are available, trim or feedback control is provided based on residual levels of gas species following the SCR catalyst, e.g., the level of $NO_X$, HC, or CO. If desired, feedback control can also be employed to trim the system in response to residual levels of ammonia.

Although perhaps somewhat effective at controlling reductant injections, the exhaust system of the '754 patent may fail to consider some critical factors affecting the reduction of $NO_X$ within the SCR catalyst. For example, a temperature of the SCR catalyst can have a great effect on the reduction efficiency of the catalyst. Similarly, a flow rate of exhaust through the catalyst (and/or an associated dwell time within the catalyst) can also have a significant impact on the reduction of $NO_X$. Because the exhaust system of the '754 patent does not take these parameters into consideration, the system may still allow sub-optimal reductant injections to occur. And, although the exhaust system of the '754 patent may trim reductant injections based on residual levels of some gas species ($NH_3$) following the SCR catalyst, there may be more efficient ways to affect those levels and additional triggers for affecting those levels.

The system of the present disclosure solves one or more of the problems set forth above and/or other problems.

SUMMARY

One aspect of the present disclosure is directed to an exhaust system for use with a combustion engine. The exhaust system may include an exhaust passageway, and a reduction catalyst disposed within the exhaust passageway. The exhaust system may also include a first sensor located to generate a first signal indicative of an operational parameter of the reduction catalyst, and a second sensor located downstream of the reduction catalyst to generate a second signal indicative of a performance parameter of the reduction catalyst. The exhaust system may further include an injection device located to inject reductant into the exhaust passageway upstream of the reduction catalyst, and a controller in communication with the combustion engine, the first sensor, the second sensor, and the injection device. The controller may be configured to determine a $NO_X$ production of the combustion engine, determine an amount of reductant that should be injected based on the $NO_X$ production and the first signal, and adjust the amount based on the second signal.

Another aspect of the present disclosure is directed to a method of operating a combustion engine. The method may include directing a flow of exhaust from the combustion engine through a reduction catalyst, sensing an operational parameter of the reduction catalyst, and sensing a performance parameter of the reduction catalyst. The method may further include determining a $NO_X$ production of the combustion engine, and determining an amount of reductant that should be injected into the exhaust flow upstream of the reduction catalyst based on the $NO_X$ production and the sensed operational parameter. The method may also include adjusting the amount of reductant that should be injected based on the sensed performance parameter, and injecting the adjusted amount of reductant.

DETAILED DESCRIPTION

Figure 1:
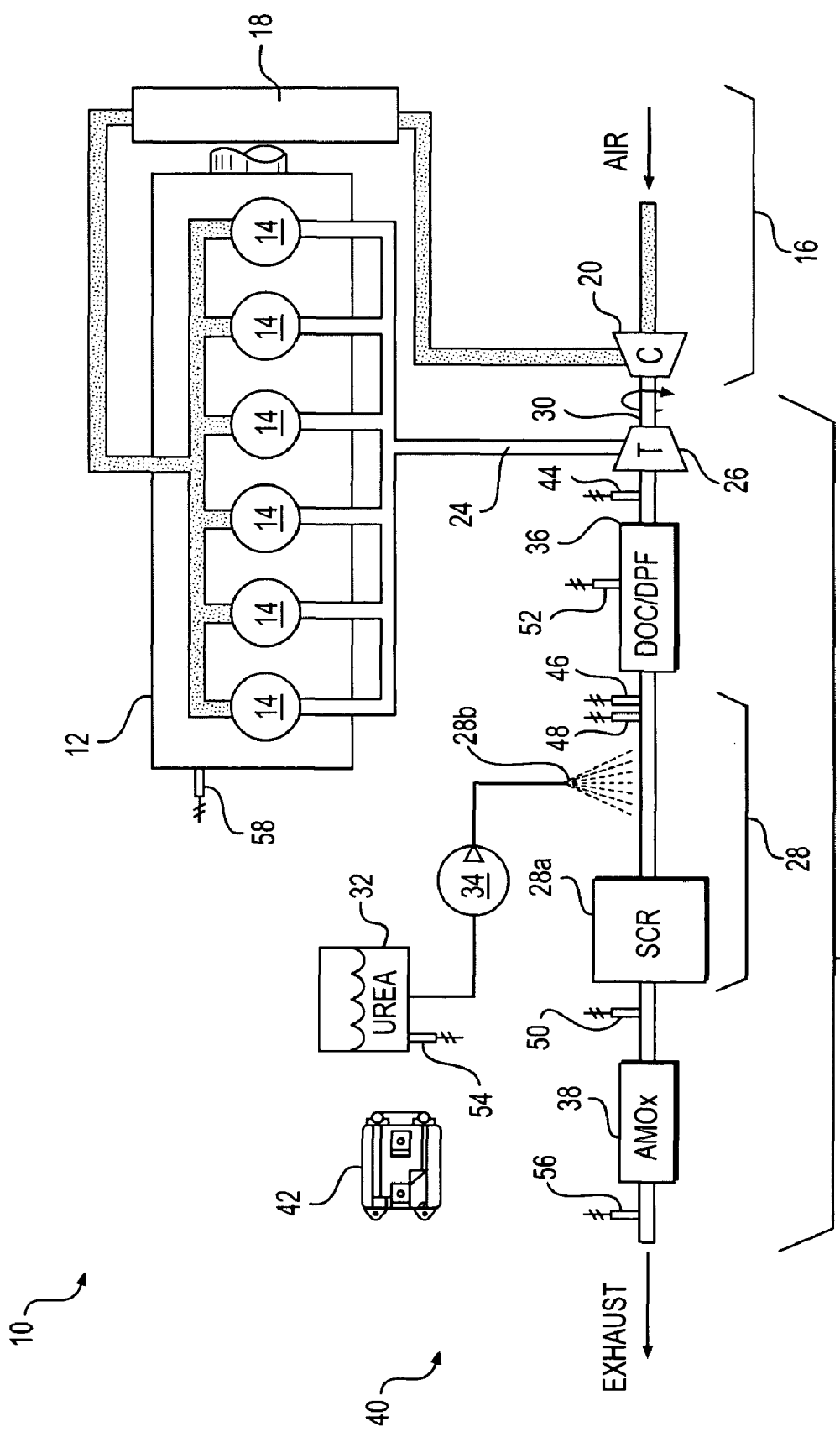
FIG. 1 is a schematic and diagrammatic illustration of an exemplary disclosed power system.

FIG. 1 illustrates an exemplary power system 10. For the purposes of this disclosure, power system 10 is depicted and described as a diesel-fueled, internal combustion engine. However, it is contemplated that power system 10 may embody any other type of combustion engine, such as, for example, a gasoline or a gaseous fuel-powered engine burning compressed or liquefied nature gas, propane, or methane. Power system 10 may include an engine block 12 at least partially defining a plurality of cylinders 14, and a plurality of piston assemblies (not shown) disposed within cylinders 14. It is contemplated that power system 10 may include any number of cylinders 14 and that cylinders 14 may be disposed in an "in-line" configuration, a "V" configuration, or any other conventional configuration.

Multiple separate sub-system may be included within power system 10. For example, power system 10 may include an air induction system 16, an exhaust system 22, and a control system 40. Air induction system 16 may be configured to direct air or an air and fuel mixture into power system 10 for subsequent combustion. Exhaust system 22 may exhaust the byproducts of combustion to the atmosphere. Control system 40 may regulate the operation of air induction and exhaust systems 16, 22 to reduce the production of regulated constituents and their discharge to the atmosphere.

Air induction system 16 may include multiple components that cooperate to condition and introduce compressed air into cylinders 14. For example, air induction system 16 may include an air cooler 18 located downstream of one or more compressors 20. Compressors 20 may be connected to pressurize inlet air directed through cooler 18. A throttle valve (not shown) may be located upstream of compressors 20 to selectively regulate (i.e., restrict) the flow of inlet air into power system 10. A restriction may result in less air entering power system 10 and, thus, affect an air-to-fuel ratio of power system 10. It is contemplated that air induction system 16 may include different or additional components than described above such as, for example, variable valve actuators associated with each cylinder 14, filtering components, compressor bypass components, and other known components that may be controlled to affect the air-to-fuel ratio of power system 10, if desired. It is further contemplated that compressor 20 and/or cooler 18 may be omitted, if a naturally aspirated engine is desired.

Exhaust system 22 may include multiple components that condition and direct exhaust from cylinders 14 to the atmosphere. For example, exhaust system 22 may include an exhaust passageway 24, one or more turbines 26 driven by the exhaust flowing through passageway 24, and a reduction catalyst 28 fluidly connected downstream of turbine 26. It is contemplated that exhaust system 22 may include different or additional components than described above such as, for example, bypass components, an exhaust compression or restriction brake, an attenuation device, additional exhaust treatment devices, and other known components, if desired.

Turbine 26 may be located to receive exhaust leaving power system 10, and may be connected to one or more compressors 20 of air induction system 16 by way of a common shaft 30 to form a turbocharger. As the hot exhaust gases exiting power system 10 move through turbine 26 and expand against vanes (not shown) thereof, turbine 26 may rotate and drive the connected compressor 20 to pressurize inlet air. In one embodiment, turbine 26 may be a variable geometry turbine (VGT) or include a combination of variable and fixed geometry turbines. VGTs are a variety of turbochargers having geometry adjustable to attain different aspect ratios such that adequate boost pressure may be supplied to cylinders 14 under a range of operational conditions. As a flow area of turbine 26 changes, the air-to-fuel ratio and, thus, the performance of power system 10 may also change. Alternatively, a fixed geometry turbocharger having an electronically controlled wastegate may be included, if desired.

Reduction catalyst 28 may receive exhaust from turbine 26 and reduce constituents of the exhaust to innocuous gases. In one example, reduction catalyst 28 may embody a Selective Catalytic Reduction (SCR) device having a catalyst substrate 28a located downstream from a reductant injector 28b. A gaseous or liquid reductant, most commonly urea $(NH_2)_2CO$, a water/urea mixture, a hydrocarbon for example diesel fuel, or ammonia gas ($NH_3$), may be sprayed or otherwise advanced into the exhaust upstream of catalyst substrate 28a by reductant injector 28b. For this purpose, an onboard reductant supply 32 and a pressurizing device 34 may be associated with reductant injector 28b. As the reductant is absorbed onto the surface of catalyst substrate 28a, the reductant may react with $NO_X$ (NO and $NO_2$) in the exhaust gas to form water ($H_2O$) and elemental nitrogen ($N_2$). The reduction process performed by catalyst 28 may be most effective when a concentration of NO to $NO_2$ supplied to reduction catalyst 28 is about 1:1.

To help provide the correct concentration of NO to $NO_2$, an oxidation catalyst 36 may be located upstream of reduction catalyst 28, in some embodiments. Oxidation catalyst 36 may be, for example, a diesel oxidation catalyst (DOC). As a DOC, oxidation catalyst 36 may include a porous ceramic honeycomb structure or a metal mesh substrate coated with a material, for example a precious metal, that catalyzes a chemical reaction to alter the composition of the exhaust. For example, oxidation catalyst 36 may include palladium, platinum, vanadium, or a mixture thereof that facilitates the conversion of NO to $NO_2$.

In an alternative embodiment, oxidation catalyst 36 may also perform particulate trapping functions (i.e., oxidation catalyst 36 may be a catalyzed particulate trap such as a CRT or CCRT). A particulate trap is a filter designed to trap or collect particulate matter. The use of the trapping function for extended periods of time may cause the particulate matter to build up in the medium of oxidation catalyst 36, thereby reducing the catalyzing functionality of the filter and, possibly, other downstream located treatment devices as well, as will be discussed in more detail below.

During operation of power system 10, it may be possible for too much urea to be injected into the exhaust (i.e., urea in excess of that required for appropriate $NO_X$ reduction). In this situation, known as "ammonia slip", some amount of ammonia may pass through catalyst substrate 28a to the atmosphere, if not otherwise accounted for. To minimize the magnitude of ammonia slip, another oxidation catalyst 38 may be located downstream of reduction catalyst 28. Oxidation catalyst 38 may include a substrate coated with a catalyst that oxidizes residual $NH_3$ in the exhaust to form water and elemental nitrogen. It is contemplated that oxidation catalyst 38 may be omitted, if desired.

Control system 40 may include components configured to regulate the treatment of exhaust prior to discharge to the atmosphere. Specifically, control system 40 may include a controller 42 in communication with a plurality of sensors (communication lines truncated in FIG. 1 for clarity). Based on input from each of the sensors, controller 42 may determine an amount of $NO_X$ being produced by power system 10, an operational parameter of reduction catalyst 28, an amount of urea that should be sprayed by reductant injector 28b into the exhaust flow based on the $NO_X$ production amount and the operational parameter, a performance parameter of reduction catalyst 28, and an adjustment of the urea injection based on the performance parameter. Controller 42 may then regulate operation of reductant injector 28b such that the adjusted amount of urea is sprayed into the exhaust flow upstream of catalyst substrate 28a.

Controller 42 may embody a single or multiple microprocessors, field programmable gate arrays (FPGAs), digital signal processors (DSPs), etc. that include a means for controlling an operation of power system 10 in response to signals received from the various sensors. Numerous commercially available microprocessors can be configured to perform the functions of controller 42. It should be appreciated that controller 42 could readily embody a microprocessor separate from that controlling other non-exhaust related power system functions, or that controller 42 could be integral with a general power system microprocessor and be capable of controlling numerous power system functions and modes of operation. If separate from the general power system microprocessor, controller 42 may communicate with the general power system microprocessor via datalinks or other methods. Various other known circuits may be associated with controller 42, including power supply circuitry, signal-conditioning circuitry, actuator driver circuitry (i.e., circuitry powering solenoids, motors, or piezo actuators), communication circuitry, and other appropriate circuitry.

A first sensor 44 of control system 40 may embody a constituent sensor configured to generate a signal indicative of the presence of a particular constituent within the exhaust flow. For instance, sensor 44 may be a $NO_X$ sensor configured to determine an amount (i.e., quantity, relative percent, ratio, etc.) of NO and/or $NO_2$ present within the exhaust of power system 10. If embodied as a physical sensor, sensor 44 may be located upstream or downstream of oxidation catalyst 36. When located upstream of oxidation catalyst 36, sensor 44 may be situated to sense a production of $NO_X$ by power system 10. When located downstream of oxidation catalyst 36, sensor 44 may be situated to sense the production of $NO_X$ and/or a conversion effectiveness of oxidation catalyst 36. Sensor 44 may generate a signal indicative of these measurements and send it to controller 42.

It is contemplated that sensor 44 may alternatively embody a virtual sensor. A virtual sensor may produce a model-driven estimate based on one or more known or sensed operational parameters of power system 10 and/or oxidation catalyst 36. For example, based on a known operating speed, load, temperature, boost pressure, ambient conditions (humidity, pressure, temperature), and/or other parameter of power system 10, a model may be referenced to determine an amount of NO and/or $NO_2$ produced by power system 10. Similarly, based on a known or estimated $NO_X$ production of power system 10, a flow rate of exhaust exiting power system 10, and/or a temperature of the exhaust, the model may be referenced to determine an amount of NO and/or $NO_2$ leaving oxidation catalyst 36 and entering reduction catalyst 28. As a result, the signal directed from sensor 44 to controller 42 may be based on calculated and/or estimated values rather than direct measurements, if desired. It is contemplated that rather than a separate element, the virtual sensing functions may be accomplished by controller 42, if desired.

The operational parameter of reduction catalyst 28 may be monitored by way of a temperature sensor 46 and/or a flow meter sensor 48. Temperature sensor 46 may be located anywhere within exhaust system 22 to generate a signal indicative of an operating temperature of reduction catalyst 28 (more specifically, of catalyst substrate 28a). In one example, temperature sensor 46 may be located upstream of catalyst substrate 28a. In another example, temperature sensor 46 may be located in contact with or downstream of catalyst substrate 28a. Flow meter sensor 48 may embody any type of sensor utilized to generate a signal indicative of an exhaust flow rate through reduction catalyst 28. The temperature and/or flow rate signals may be utilized by controller 42 to determine a reducing capacity of reduction catalyst 28. That is, based on known dimensions and age of reduction catalyst 28, and based on the measured operational parameters, a performance of reduction catalyst 28 may be predicted. It is contemplated that flow meter sensor 48 may alternatively embody a virtual sensor, similar to sensor 44, if desired.

Similar to reduction catalyst 28, the operation of oxidation catalyst 36 may be monitored by way of a temperature sensor (not shown). The oxidation catalyst temperature sensor may be located anywhere within exhaust system 22 to generate a signal indicative of an operating temperature of oxidation catalyst 36. This temperature signal may be utilized by controller 42 to determine a model driven estimate of the split of $NO:NO_2$ exiting oxidation catalyst 36.

Figure 2:
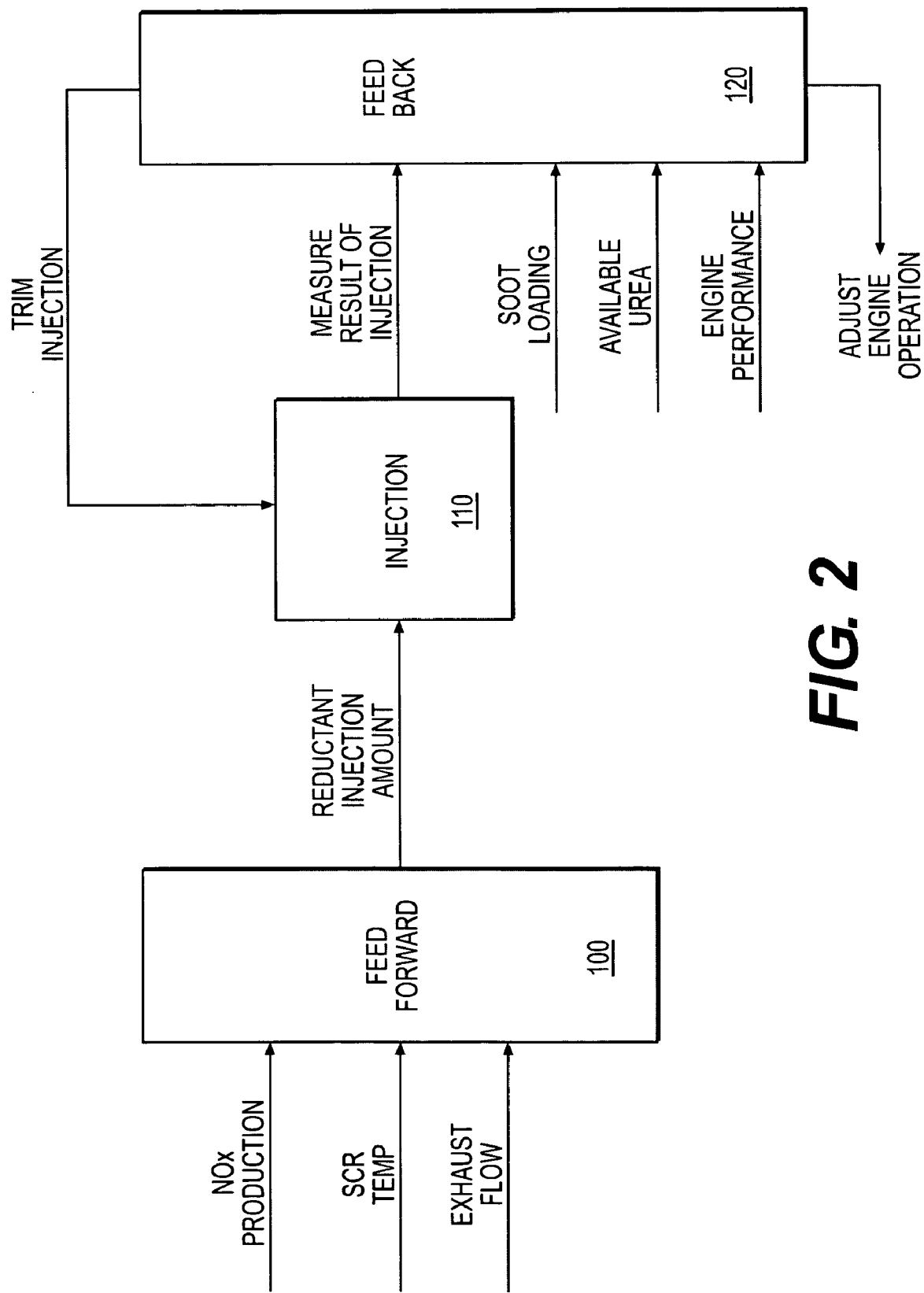
FIG. 2 is a control chart depicting an exemplary operation that may be performed by the power system of FIG. 1.

As illustrated in the control chart of FIG. 2, the $NO_X$ production signal, the temperature signal, and the flow rate signal from sensors 44-48 may be utilized by controller 42 to determine an amount of reductant that should be injected to reduce the produced $NO_X$ to an acceptable level. That is, based on the current operation and the predicted performance of reduction catalyst 28, controller 42 may reference a relationship map stored in memory thereof to determine an initial quantity of reductant that should be injected. The map may include any collection of data in the form of tables, graphs, and/or equations (e.g., regression equations, neural network models, decision or binary tree models, physics equations that describe a system, etc.) that represents an intended relationship. This process of determining the initial injection amount based on information from the map may be known as feedforward control and is illustrated in FIG. 2 as control block 100.

Controller 42 may then adjust the injection amount determined in control block 100 based on actual performance parameters measured downstream of reduction catalyst 28. That is, after an initial reductant injection (illustrated as control block 110 in FIG. 2) of the quantity determined above, controller 42 may sense the actual performance of reduction catalyst 28 and adjust future reductant injections accordingly. For this purpose, control system 40 may include a constituent sensor 50 located downstream of catalyst substrate 28a. This process of adjusting the injection amount based on a measured performance parameter may be known as feedback control and is illustrated as control block 120 in FIG. 2.

Similar to sensor 44, sensor 50 may also generate a signal indicative of the presence of a particular constituent within the exhaust flow. For instance, sensor 50 may be a $NO_X$ sensor configured to determine an amount (i.e., quantity, relative percent, ratio, etc.) of NO and/or $NO_2$ present within the exhaust flow downstream of reduction catalyst 28. Sensor 50 may generate a signal indicative of these measurements and send it to controller 42. If the amount of $NO_X$ monitored by sensor 50 exceeds a threshold level, controller 42 may provide feedback to reductant injector 28b to increase the amount of urea injected into passageway 24 to further reduce $NO_X$ within reduction catalyst 28. In contrast, if the amount of $NO_X$ monitored by sensor 50 is below a threshold level, less urea may be injected in an attempt to conserve urea and/or extend the useful life of oxidation catalyst 38. Alternatively, sensor 50 may embody an $NH_3$ sensor useful in determining the amount of $NH_3$ entering oxidation catalyst 38, if desired.

As mentioned above, with respect to oxidation catalyst 36, a soot loading condition can negatively affect operation of downstream components, for example, reduction catalyst 28. That is, if oxidation catalyst 36 is overloaded with particulate matter, the relative amount of $NO_2$ being received by reduction catalyst 28 could be negatively effected, even though oxidation catalyst 36 may be properly converting NO to $NO_2$. To accommodate this situation, the soot loading of oxidation catalyst 36 may be monitored, and the operation of reduction catalyst 28 adjusted accordingly (see control block 120). For this purpose, an additional sensor 52 may be associated with oxidation catalyst 36 (referring to FIG. 1).

Sensor 52 may embody any type of sensor utilized to determine an amount of particulate buildup within oxidation catalyst 36. For example, sensor 52 may embody a pressure sensor or pair of pressure sensors, a temperature sensor, a model driven virtual sensor, an RF sensor, or any other type of sensor known in the art. Sensor 52 may generate a signal directed to controller 42 indicative of the particulate buildup, and controller 42 may adjust the injection of reductant accordingly.

It is contemplated that controller 42 may also trim reductant injections based on an amount of urea available for injection. That is, in some situations such as when the urea in supply 32 is frozen (or otherwise not in a form or concentration unsuitable for injection), the amount of urea available for injection may be less than the injection amount determined to be necessary from feedforward control (or less than necessary for extended operation of power system 10). In another situation, the solution of urea within supply 32 may be improper (too weak). In these situations, controller 42 may vary (i.e., reduce or increase) the injection amount until the correct amount of urea becomes available. Controller 42 may also adjust operation of supply 32 and/or pressurizing device 34 to accommodate changing needs of exhaust system 22 (e.g., controller 42 may activate a heater within supply 32 or change a pressure induced by device 34).

To determine the availability of urea, control system 40 may include a sensor 54 (referring to FIG. 1) associated with supply 32. Sensor 54 may be a temperature sensor, a viscosity sensor, a fluid level sensor, a pressure sensor, or any other type of sensor configured to generate a signal indicative of an amount of urea available for injection. This signal may be directed from sensor 54 to controller 42.

In some situations, it may be possible to inject too much urea resulting in ammonia slip. Although oxidation catalyst 38, if present, may oxidize the slipping ammonia such that little, if any, ammonia is exhausted to the atmosphere, the extra ammonia may still unnecessarily increase the operational costs of power system 10. For this reason, controller 42 may be configured to trim reductant injections based on a measured amount of ammonia downstream of reduction catalyst 28 (upstream or downstream of oxidation catalyst 38). Ammonia slip may be monitored by a sensor 56. Sensor 56 may be located within passageway 24 to generate a signal indicative of a concentration of $NH_3$ therein. This signal may be directed from sensor 56 to controller 42. Alternatively, sensor 56 may embody a $NO_X$ sensor useful in determining the amount of $NO_X$ exiting oxidation catalyst 38, if desired.

Although one focus of controller 42 may be to regulate injections of urea and thereby control an amount of $NO_X$ being exhausted to the atmosphere, there may be other ways to also control the amount of $NO_X$ passing from exhaust system 22. That is, it may be possible to adjust engine operation of power system 10 to vary (i.e., reduce or increase) the amount of $NO_X$ being produced. For example, the air-to-fuel ratio of power system 10 may be adjusted by way of variable valve actuation, throttling, VGT control, engine braking, exhaust gas recirculation, multiple fuel injection events having variable injection pressure, and other ways known in the art.

Before adjusting engine operation to vary $NO_X$ production, controller 42 may first weigh potential effects of the adjustment on engine performance. That is, in some situations, an effect of an operational adjustment that changes $NO_X$ production could be minimal, or the effect could have significant impact on engine efficiency or responsiveness. Based on a measured, known, or anticipated effect, controller 42 may selectively adjust the air-to-fuel ratio of power system 10 together with or instead of the amount of reductant being sprayed into passageway 24 by reductant injector 28b. In this manner, $NO_X$ reduction may be facilitated while optimizing operations of power system 10. To monitor engine performance of power system 10, an additional sensor 58 may be included within control system 40.

INDUSTRIAL APPLICABILITY

The exhaust system of the present disclosure may be applicable to any power system having a reduction catalyst, where precise control of reductant injections is important. Injection control may be improved by providing both feedforward and feedback control. Operation of power system 10 will now be described.

Referring to FIG. 1, air induction system 16 may pressurize and force air or a mixture of air and fuel into cylinders 14 of power system 10 for subsequent combustion. The fuel and air mixture may be combusted by power system 10 to produce a mechanical work output and an exhaust flow of hot gases. The exhaust flow may contain a complex mixture of air pollutants composed of gaseous material, which can include oxides of nitrogen ($NO_X$). As this $NO_X$ laden exhaust flow is directed from cylinders 14 through oxidation catalyst 36, NO may be converted to $NO_2$.

Following oxidation catalyst 36, the exhaust flow may be directed toward reduction catalyst 28, where the $NO_X$ may be reduced to water and elemental nitrogen. Prior to reaching reduction catalyst 28, controller 42 may, based on input from sensors 44 and 50, determine an amount of reductant required for reduction catalyst 28 to sufficiently reduce the $NO_X$ produced by power system 10. Then, based on previously measured performance parameters of oxidation catalyst 36 and input from sensors 52, 54, 56, and/or 58, the amount of reductant may be adjusted for the current injection event.

After reduction within catalyst 28, the exhaust may pass through oxidation catalyst 38 to the atmosphere. Within oxidation catalyst 38, any extra ammonia may be reduced to innocuous substances.

Several advantages may be associated with power system 10. For example, because controller 42 may consider all of the critical factors significantly affecting $NO_X$ reduction, including $NO_X$ production, the capacity of reduction catalyst 28 to reduce $NO_X$, an amount of available urea, and soot loading of a catalyzed particulate trap, the exhaust emissions of power system 10 may be maintained at desired levels under a range of operating conditions. In addition, because controller 42 may selectively implement engine operational adjustments to reduce $NO_X$ production in conjunction with reductant injection control, power system 10 may be efficient and responsive.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. For example, additional temperature sensors (not shown) may be included within the disclosed system to improve accuracy in $NO_X$ reduction, and associated with, among other things, the inlet and outlet of oxidation catalyst 36, the inlet and outlet of reduction catalyst 28, and the inlet and outlet of oxidation catalyst 38. It is intended that the specification and examples be considered as exemplary only, with a true scope of the disclosure being indicated by the following claims and their equivalents.

What is claimed is:

1. An exhaust system for a combustion engine, comprising:
an exhaust passageway;
a reduction catalyst disposed within the exhaust passageway;

an injection device located to inject reductant into the exhaust passageway upstream of the reduction catalyst;

a particulate filter located upstream of the reduction catalyst;

a soot sensor configured to determine an amount of soot loading in the particulate filter; and a controller in communication with the soot sensor and the injection device, the controller being configured to:

determine an amount of reductant that should be injected at least partially based on the soot loading in the particulate filter.

2. The exhaust system of claim 1, wherein the particulate filter includes an oxidation catalyst.

3. The exhaust system of claim 1, further including an ammonia oxidation catalyst located downstream of the reduction catalyst.

4. The exhaust system of claim 1, wherein the particulate filter converts a first exhaust constituent to a second exhaust constituent in preparation for reduction of at least one of the first and the second exhaust constituents by the reduction catalyst.

5. The exhaust system of claim 1, wherein the soot sensor is at least one of a pressure sensor, a pair of pressure sensors, a temperature sensor, a model driven virtual sensor, or an RF sensor.

6. The exhaust system of claim 1, further including:

a first sensor located to generate a first signal indicative of an operational parameter of the reduction catalyst; and a second sensor located downstream of the reduction catalyst to generate a second signal indicative of a performance parameter of the reduction catalyst;

wherein the controller is in communication with the first sensor and the second sensor, the controller being configured to:

determine a $NO_X$ production of the combustion engine;

determine the amount of reductant that should be injected based further on the $NO_X$ production and the first signal.

7. The exhaust system of claim 6, wherein the operational parameter is at least one of a temperature of the reduction catalyst and a flow rate of exhaust passing through the reduction catalyst.

8. The exhaust system of claim 6, wherein the performance parameter is at least one of an amount of $NO_X$ and an amount of $NH_3$ detected within the exhaust flow.

9. The exhaust system of claim 6, wherein the controller is further configured to:

determine residual $NO_X$ within the exhaust downstream of the reduction catalyst based on the second signal;

determine an operational adjustment of the combustion engine that changes the production of $NO_X$;

determine an effect the operational adjustment of the combustion engine will have on at least one of efficiency and responsiveness of the combustion engine; and selectively implement the operational adjustment of the combustion engine based on the determined effect.

10. The exhaust system of claim 1, wherein the controller is further configured to determine an operational parameter of the injection device, and to determine the amount of reductant that should be injected based further on the operational parameter of the injection device.

11. The exhaust system of claim 10, wherein the operational parameter of the injection device is an amount of reductant available for injection.

12. A method of operating a combustion engine, comprising:

directing a flow of exhaust from the combustion engine through a reduction catalyst;

collecting particulate matter from the exhaust flow upstream of the reduction catalyst;

determining an amount of particulate matter build up upstream of the reduction catalyst;

determining an amount of reductant that should be injected into the exhaust flow upstream of the reduction catalyst based at least partially on the amount of particulate matter build up; and injecting the determined amount of reductant.

13. The method of claim 12, further including converting a first exhaust constituent to a second exhaust constituent in preparation for reduction of both the first and the second exhaust constituents by the reduction catalyst and the amount of particulate matter build up effects the converting of the first exhaust constituent to the second exhaust constituent.

14. The method of claim 12, wherein the amount of particulate matter build up is determined by a soot sensor and wherein the soot sensor is at least one of a pressure sensor, a pair of pressure sensors, a temperature sensor, a model driven virtual sensor, or an RF sensor.

15. The method of claim 12, further including:

sensing an operational parameter of the reduction catalyst;

sensing a performance parameter of the reduction catalyst;

determining a $NO_X$ production of the combustion engine;

determining the amount of reductant that should be injected into the exhaust flow upstream of the reduction catalyst based on the $NO_X$ production and the sensed operational parameter;

wherein the amount of reductant that should be injected is determined based further on the sensed performance parameter.

16. The method of claim 15, wherein the performance parameter is at least one of an amount of $NO_X$ and an amount of $NH_3$ detected within the flow of exhaust and the operational parameter is at least one of a temperature of the reduction catalyst and a flow rate of exhaust passing through the reduction catalyst.

17. The method of claim 15, wherein:

sensing a performance parameter of the reduction catalyst includes determining an excessive amount of $NO_X$ remaining within the exhaust downstream of the reduction catalyst; and the method further includes:

determining an operational adjustment of the combustion engine that reduces the production of $NO_X$;

determining an effect the operational adjustment of the combustion engine will have on at least one of efficiency and responsiveness of the combustion engine; and selectively implementing the operational adjustment of the combustion engine based on the determined effect.

18. The method of claim 12, wherein the particulate matter is built up in a particulate filter and the amount of particulate matter build up is determined by a soot sensor associated with the particulate filter.

19. The method of claim 18, wherein the particulate filter is configured to convert Nitrogen Monoxide (NO) into Nitrogen Dioxide (NO2).

20. A power system, comprising:

an engine configured to combust fuel and generate a flow of exhaust;

an exhaust passageway leading from the engine to the atmosphere;
an SCR catalyst disposed within the exhaust passageway;
an injection device located to inject urea into the exhaust passageway upstream of the SCR catalyst;
a particulate filter located upstream of the injection device;
a soot sensor configured to determine an amount of soot loading in the particulate filter; and
a controller in communication with the engine, the soot sensor, and the injection device, the controller being configured to:
 determine an amount of urea that should be injected based at least partially on the soot loading in the particulate filter.

* * * * *